US009417678B2

(12) United States Patent
Grziwok et al.

(10) Patent No.: US 9,417,678 B2
(45) Date of Patent: Aug. 16, 2016

(54) MAGNET KEY

(71) Applicant: Lilitab LLC, San Rafael, CA (US)

(72) Inventors: Bryan Rudolf Grziwok, Berkeley, CA (US); Adam Scott Aronson, San Rafael, CA (US)

(73) Assignee: Lilitab LLC, San Rafael, CA (US)

( * ) Notice: Subject to any disclaimer, the term of this patent is extended or adjusted under 35 U.S.C. 154(b) by 170 days.

(21) Appl. No.: 14/209,829

(22) Filed: Mar. 13, 2014

(65) Prior Publication Data

US 2014/0281633 A1    Sep. 18, 2014

Related U.S. Application Data

(60) Provisional application No. 61/801,577, filed on Mar. 15, 2013.

(51) Int. Cl.
*G06F 1/32* (2006.01)

(52) U.S. Cl.
CPC ...... *G06F 1/3206* (2013.01); *G06F 2200/1633* (2013.01)

(58) Field of Classification Search
CPC .................................. G06F 1/26; G06F 1/1626
USPC .......................................................... 713/323
See application file for complete search history.

(56) References Cited

U.S. PATENT DOCUMENTS

| | | | | |
|---|---|---|---|---|
| 6,223,294 B1* | 4/2001 | Kondoh | ................ | G06F 1/3215 345/179 |
| 6,379,073 B1 | 4/2002 | Yoo | | |
| 6,681,333 B1* | 1/2004 | Cho | ...................... | G06F 1/1626 345/179 |
| 7,210,046 B2* | 4/2007 | Truong | ................. | G06F 1/1613 178/19.01 |
| 7,218,510 B2 | 5/2007 | Hillman | | |
| 7,316,377 B2 | 1/2008 | Smed | | |
| 7,694,922 B2 | 4/2010 | Kim | | |
| 8,964,379 B2* | 2/2015 | Rihn | ...................... | G06F 1/1616 335/288 |
| 2004/0100457 A1 | 5/2004 | Mandle | | |
| 2005/0273845 A1* | 12/2005 | Urano | ...................... | G06F 21/34 726/9 |
| 2006/0055526 A1 | 3/2006 | Long | | |
| 2008/0123286 A1* | 5/2008 | Watanabe | ............. | G06F 1/1616 361/679.27 |

(Continued)

OTHER PUBLICATIONS

Authorized officer Eva Hehn, Notification of Transmittal of the International Search Report and the Written Opinion of the International Searching Authority, International Application No. PCT/US2014/026402, mailed Oct. 10, 2014, 13 pages.

(Continued)

*Primary Examiner* — Vincent Tran
(74) *Attorney, Agent, or Firm* — Fish & Richardson P.C.

(57) ABSTRACT

A device for affecting a sleep mode of an electronic device includes an elongate member and a magnet. The magnet is disposed within the elongate member, and the elongate member and the magnet are shaped and sized to activate a magnetic sleep sensor of the electronic device in response to the magnet being placed in proximity of the magnetic sleep sensor. A system for affecting a sleep mode of an electronic device includes a housing to receive the electronic device, and a device for activating a sleep mode of the electronic device. The housing has an aperture, and the device has a magnet. The device is configured to activate a magnetic sleep sensor on the electronic device.

21 Claims, 4 Drawing Sheets

(56) References Cited

U.S. PATENT DOCUMENTS

| | | | | |
|---|---|---|---|---|
| 2008/0225018 A1* | 9/2008 | Pang | G06F 1/1626 345/179 |
| 2009/0051357 A1* | 2/2009 | Sasaki | G01R 33/091 324/228 |
| 2010/0045626 A1* | 2/2010 | Nicolas | G06F 1/1626 345/173 |
| 2011/0120906 A1* | 5/2011 | Umholtz | A47B 88/20 206/557 |
| 2012/0061542 A1 | 3/2012 | Bostater | |
| 2012/0086391 A1* | 4/2012 | Smith | H02J 7/0044 320/107 |
| 2013/0102285 A1* | 4/2013 | Suginaka | G06F 21/32 455/411 |
| 2014/0070472 A1* | 3/2014 | Plaszewski | B25B 11/002 269/8 |

OTHER PUBLICATIONS http://armodilo.com/products/armotwist, Armodilo ArmoTwist, 2013, downloaded Sep. 25, 2013, 3 pages.

http://www.ipadenclosures.com/ipad_kiosk_enclosure/ipad_table_mounts_stands/axis-ipad-table-mount, iPad Enclosures LLC, Axis iPad Mount, 2013, downloaded Sep. 25, 2013, 4 pages.

* cited by examiner

MAGNET KEY

CROSS REFERENCE TO RELATED APPLICATIONS

This disclosure claims the benefit of the priority of U.S. Provisional Application Ser. No. 61/801,577, filed Mar. 15, 2013, and entitled "Magnet Key", which is incorporated herein by reference in its entirety.

TECHNICAL FIELD

This disclosure relates to a device and system for affecting a sleep mode of an electronic device.

BACKGROUND

Electronic devices, especially portable ones such as laptop and tablet computers, are often equipped with sensors designed to determine when the electronic device's lid (or protective cover) has been closed. The sensor in question often detects the magnetic field created by a magnet disposed within the lid or cover. When this field is sensed, the sensor sends a signal to the microprocessor and the electronic device enters "sleep mode"—a low power mode, also known as "stand by" or "suspend," in which the electronic device's state is preserved in memory. When the electronic device's lid or protective cover is subsequently opened, the sensor sends a signal to the microprocessor to cause the electronic device to resume its fully active state.

SUMMARY

This disclosure relates to a magnet key, designed for use with electronic devices, for example, computers (such as tablet computers) that can be powered on or off and/or placed into sleep mode based on a magnetic field that surrounds a sensor.

In certain aspects, a device for affecting a sleep mode of an electronic device includes an elongate member and a magnet disposed within the elongate member. The elongate member and the magnet are shaped and sized to activate a magnetic sleep sensor of an electronic device in response to the magnet disposed within the elongate member being placed in proximity of the magnetic sleep sensor.

In certain aspects, a system for affecting a sleep mode of an electronic device includes a housing to receive an electronic device, and a device for activating a sleep mode of an electronic device. The housing includes an aperture. The device includes a magnet, and the device is configured to activate a magnetic sleep sensor on the electronic device.

Implementations can include some, none, or all of the following features. The elongate member and the magnet collectively form a sleep mode key. The elongate member and the magnet collectively form a pocketable fob. The elongate member is shaped and sized to be received in an aperture on a housing of the electronic device to activate the magnetic sleep sensor on the electronic device, the housing to receive the electronic device. The aperture is a slot formed in the housing of the electronic device, and the magnet disposed in the elongate member is configured to be received in the slot. The device includes a connector to connect the magnet disposed within the elongate member to the housing, and the connector is configured to securely attach the device to the housing to activate the sleep sensor on the electronic device. The magnet disposed within the elongate member is configured to be magnetically held in the housing by magnetic forces induced by a magnetic metal plate included in the housing. The device includes a left cover portion and a right cover portion, and the elongate member is disposed between the left cover portion and the right cover portion. Either the left cover portion or the right cover portion comprises a label. The label indicates a polarity of the magnet relative to the cover portion on which the label resides. The elongate member includes a longitudinal axis and defines an opening at a first end of the elongate member formed at an angle relative to the longitudinal axis, and the magnet is positioned in the opening. A size of the elongate member at a second end is greater than a size of the elongate member at the first end. The elongate member includes an opening formed at the second end. The elongate member includes at least one of thermoplastic, epoxy or elastomeric material. The elongate member includes at least one of flexible, elastic, heat-resistant material. The elongate member includes nylon. The aperture includes a slot, and the housing includes a magnetic plate configured to magnetically retain the device in the slot. The device includes an elongate member, the magnet is disposed in the elongate member, and the elongate member and the magnet are shaped and sized to be received in the aperture. The device includes a mechanical arm, a toggle connected to the mechanical arm, and a push button connected to the mechanical arm. The mechanical arm is configured to be actuated to position the device to activate the magnetic sleep sensor, and the magnet is disposed within the mechanical arm. The mechanical arm is configured to toggle the toggle between a first position in which the device activates the magnetic sleep sensor and a second position in which the device does not activate the magnetic sleep sensor. The push button is configured to be pushed to actuate the mechanical arm and toggle the toggle between the first position and the second position. The housing includes a pin connected to the housing and extending into a track of the toggle, and the toggle is configured to move around the pin to follow the track in response to a push of the push button to actuate the mechanical arm. The housing also includes a plurality of springs connected on one end to the mechanical arm and on another end to the housing, the plurality of springs configured to pull the mechanical arm to toggle the toggle into either the first position or the second position.

Details of one or more implementations of the subject matter described in this specification are set forth in the accompanying drawings and the description below. Other features, aspects, and potential advantages will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
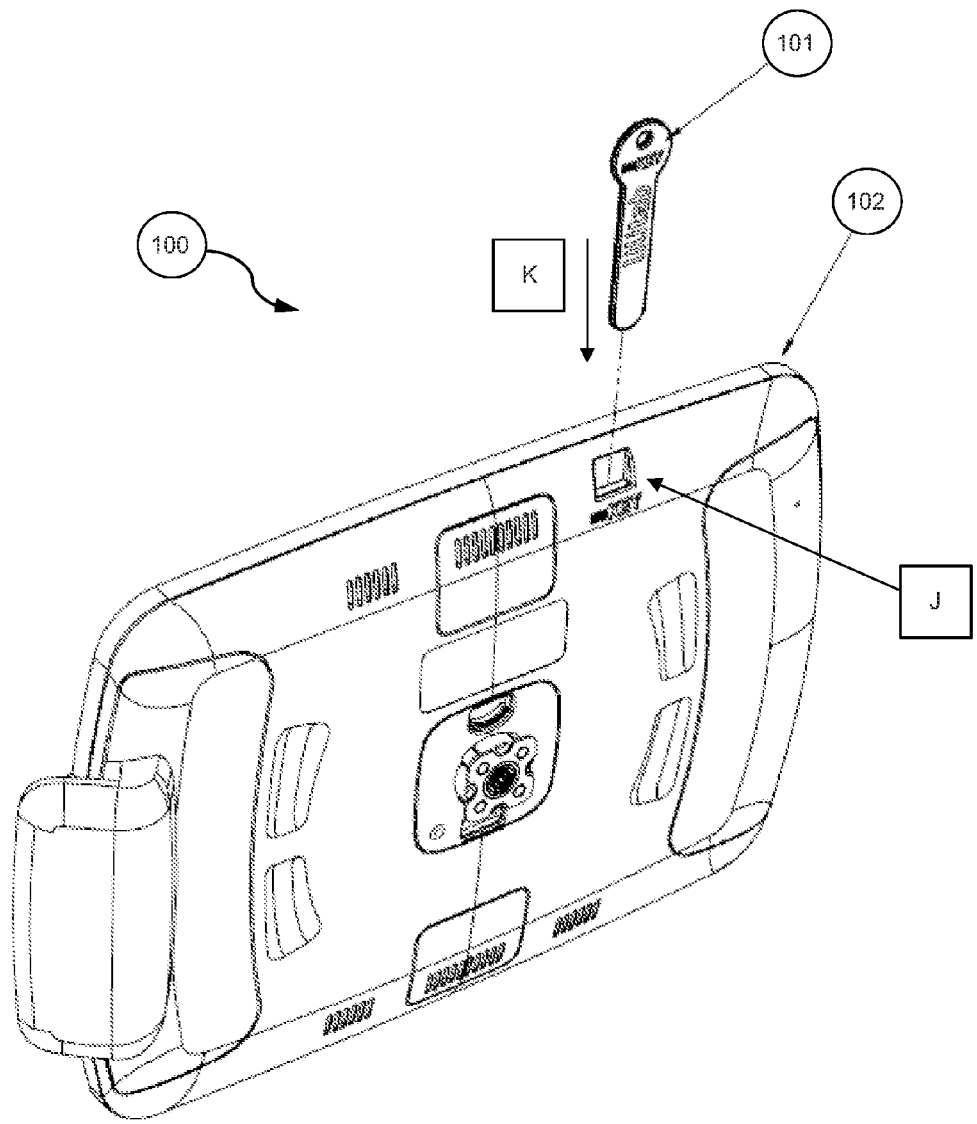
FIG. 1 illustrates an example electronic device system.

This disclosure relates to a magnet key, designed for use with electronic devices, for example, tablet computers. The magnet key described here can be implemented in conjunction with sensors designed to determine when a cover of an electronic device has been closed. The electronic device can be implemented in a commercial environment. In such environments, which can include, for example, a retail area or an eating area of a restaurant, main power often is turned off after closing time. If electronic devices, such as tablet computers, are present in the area, they will lose power too. After some time, their batteries will drain, and the electronic devices will shut down. This tends to be an undesirable situation because the electronic device may be fully secured (such as when it is disposed within a tamper-resistant enclosure), and because employees generally do not have access to the electronic devices, it may be difficult or impossible for such employees, when opening for business the following morning, to restart the electronic device software because the electronic device's battery has drained overnight and, for example, the tablet computer is reset.

The magnet key as described herein may be used to alleviate battery drainage and its attendant problems. In the "sleep mode" function, a magnetic sleep sensor incorporated in the electronic device detects the magnetic field created by a magnet, for example, disposed within a lid or protective cover. When the magnetic field is detected by the magnetic sleep sensor, the sensor sends a signal to the microprocessor and the electronic device enters "sleep mode". The magnet key can be implemented as a fob, for example, to be attached to a key chain. The magnet key incorporates within it, a magnet which, when placed correctly (e.g., adjacent to) with respect to the device's sleep sensor (e.g., a magnetically activated Hall Effect sensor), triggers the electronic device's magnetic sleep sensor, for example, the Hall effect sensor in the electronic device, causing the electronic device to enter "sleep mode." In some instances while the electronic device is in sleep mode, any currently-running software application being executed by the electronic device is paused and stored in non-volatile memory, as is information describing the electronic device's current state, and most power-consuming functions of the electronic device are turned off. When sleep mode is exited, this process is reversed, with the electronic device "waking up," restoring state, and the application being resumed. This type of behavior would be beneficial when power is restored to the retail floor after the establishment opens for business.

When the electronic device is encapsulated in a housing, sometimes referred to as a "kiosk", the magnet key can enter an aperture, for example, a slot, in the housing. In some implementations, a housing can be an enclosure which is designed to prevent access by unauthorized persons, thus providing security to the contents within the housing. Such contents may include a tablet computer system or other electronic equipment or electronic device. Aspects of a secure enclosure can include physical robustness and toughness to resist abuse, without fasteners or methods of opening the enclosure without permanently damaging the enclosure. The aperture is positioned at an appropriate location (e.g., in a particular location in the back of the secure enclosure), so that when the magnet key is inserted into the aperture, the magnet in the magnet key is positioned over the magnetic sleep sensor in the electronic device. In some implementations, the housing includes a metal plate adjacent to the aperture where the magnet key enters, so that the magnet key magnetically attaches to the metal plate, and is therefore retained in the slot by a magnetic force. The housing can be a physical part of a secure enclosure, for example, a front housing, a rear housing, and the like. In some implementations, a housing can be a portion of the secure enclosure, for example, the portion which is behind the tablet computer system. In other implementations, the housing can be the entire secure enclosure. The kiosk can be the housing, or the secure enclosure, in the context of a public environment.

In some implementations, a magnet key is inserted into the aperture of each housing at closing time. An aperture is bespoken in the housing at a location that is specific to an electronic device that is secured in the enclosure. For example, a first manufacturer of a first tablet computer system may position a sleep sensor at a first location on the first tablet computer system. A second manufacturer of a second tablet computer system can position a sleep sensor at a second location on the second tablet computer system. Because sleep sensors of different electronic devices can be positioned at different locations on the electronic devices, apertures to receive the magnet keys can be bespoken at corresponding locations in the housings designed for the electronic devices. This puts the electronic device, for example, tablet computer, contained inside the housing to sleep, thus preserving battery life and maintaining the application software active and in memory, for example, when power on the retail floor is turned off for the night. When employees arrive to open the store in the morning, and after power is restored, the magnet keys can be removed from the housings. When the magnet key is removed, the electronic device wakes from sleep mode and returns to the state and application that were active when sleep mode was entered. As a result, the device battery is conserved, and the device application is able to continue running, without staff needing to access the equipment within the secure kiosk housing. In this manner, the magnet key described here leverages the magnetic sleep function implemented using form-fitting cases magnet key to place a tablet computer in a sleep mode, thereby saving battery power.

Implementations of the technology described here can provide one or more of the following potential advantages. The magnet key can maintain the functional operation of an electronic device, for example, a tablet computer, without physical access to the electronic device by a user, even when mains power is turned off during non-business hours. The magnet key can be implemented as a fob, suitable for placement on a keychain, which contains a magnet. To accommodate the fob, the housing can include a slot or other provision for positioning which positions the magnet in the magnet key over the magnetic sleep sensor in compatible electronic devices. The housing can additionally include a metal plate which magnetically secures the magnet key in place. A label or other marking on the magnet key can be included to facilitate orientation of the key by the user, for example, when magnet polarity is important. A label on the front and back of the magnet key can be included, for example, to identify the use of the item and provide branding opportunities. In other implementations, the magnet key is not removable from the housing, and can activate and de-activate the magnetic sleep sensor on the electronic device by a guided movement of the magnet key.

FIG. 1 shows an example electronic device system 100. The electronic device system 100 includes a device 101 configured to be insertable into an aperture J of a housing 102. The housing 102 is adapted to encapsulate an electronic device, for example, a tablet computer. Alternately, housing 102 may be the outer housing of the electronic device itself. The device 101 can be inserted along direction K into the aperture J in the housing 102. Alternately, device 101 may be attached to the surface of housing 102, or otherwise constrained and held in a specific position proximate to the sleep sensor within housing 102. If a compatible electronic device is present in the housing 102, a magnet contained in the device 101 can cause the device to enter a "sleep mode" of the electronic device.

Figure 2:
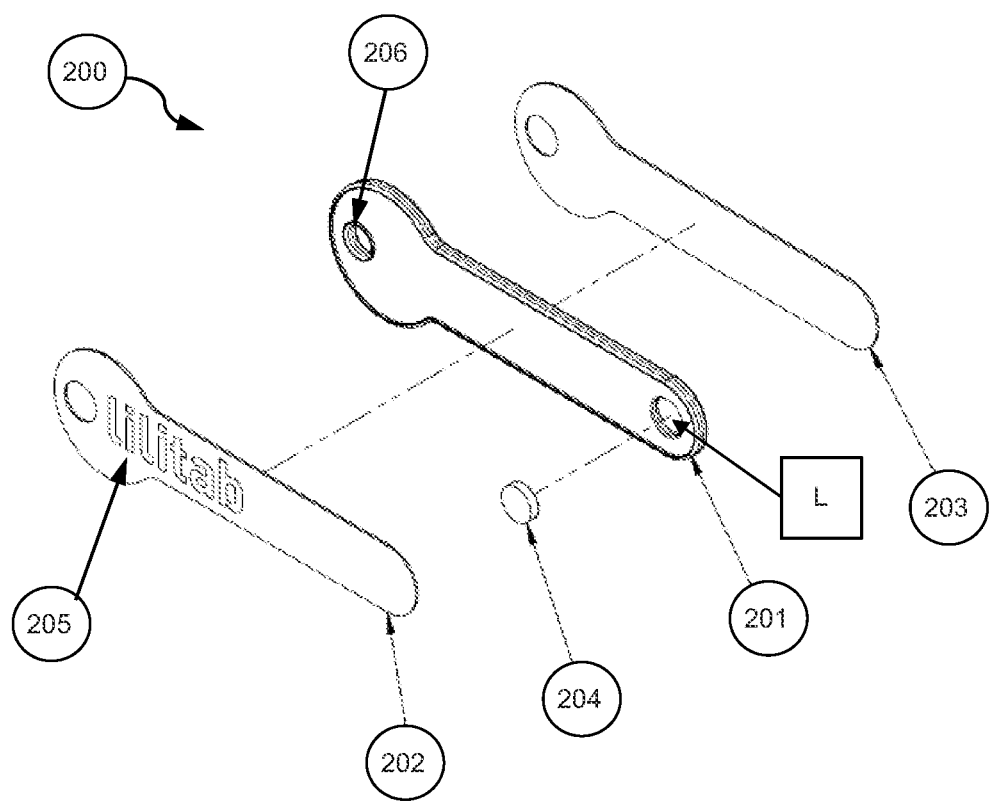
FIG. 2 shows an exploded view of an example device for activating a sleep mode of an electronic device.

FIG. 2 shows an example device 200 that can be used in the electronic device system 100 of FIG. 1. The device 200 includes an elongate member 201 and a magnet 204 disposed within the elongate member 201. The elongate member 201 and the magnet 204 are shaped and sized to activate a magnetic sleep sensor of an electronic device in response to the magnet 204 disposed within the elongate member 201 being placed in proximity of the magnetic sleep sensor. The elongate member 201 has a longitudinal axis and has an opening L at a first end of the elongate member formed at an angle relative to the longitudinal axis. In some implementations, a size of the elongate member 201 at a second end is greater than a size of the elongate member 201 at the first end. The magnet 204 is positioned in the opening L in the elongate member 201. In some implementations, the magnet 204 is press-fit or slip-fit into the opening L. In other implementations, the magnet 204 is positioned on a surface of the elongate member. In some implementations, the elongate member 201 includes an opening 206 formed at the second end of the elongate member 201.

In some implementations, the device 200 includes a left cover portion 202 and a right cover portion 203. The elongate member 201 is disposed between the left cover portion 202 and the right cover portion 203. The left cover portion 202, the right cover portion 203, both the left cover portion 202 and the right cover portion 203, and/or the elongate member 201 can comprise a label. For example, the cover can be comprised of a label. FIG. 2 shows the label 205 as the left cover portion 202 with an imprinted word on the side of the left cover portion 202. However, the label 205 can take many forms. For example, the label 205 can include a cover portion with a letter or letters, shape, symbol, diagram, color identification, and/or other identifiable form. In applications where polarity of the magnet 204 is relevant, the left cover portion 202 and right cover portion 203 can be made visually distinct for ease of use—e.g., the left cover portion can have explanatory text and/or a graphic indication of the magnet's 204 positive pole, and the right cover portion can bear a graphic indication of the magnet's negative pole, or vice versa, as appropriate. In some implementations, the left cover portion 202 and right cover portion 203 surround the elongate member 201 and magnet 204, for example, such that the magnet 204 is hidden from view.

Other construction methods are possible, including insert-molding of the magnet 204 within a plastic material used to form the elongate member 201, thus eliminating the inclusion of the left cover portion 202 and/or the right cover portion 203. Insert-molding of the magnet 204 within the elongate member 201 may eliminate the possibility of label peeling.

In some implementations, the elongate member 201 includes at least one of thermoplastic, epoxy, or elastomeric material. In other instances, the elongate member 201 includes at least one of flexible, elastic, heat-resistant material, for example, nylon. Advantages of a flexible, elastic, heat-resistant material include that the elongate member 201 will not distort or be damaged in a pocket or in the hot trunk of a car. A simple, cost-effective construction, such as is shown in FIG. 2, can provide advantages including reduction in the cost of replacement keys.

Figure 3:
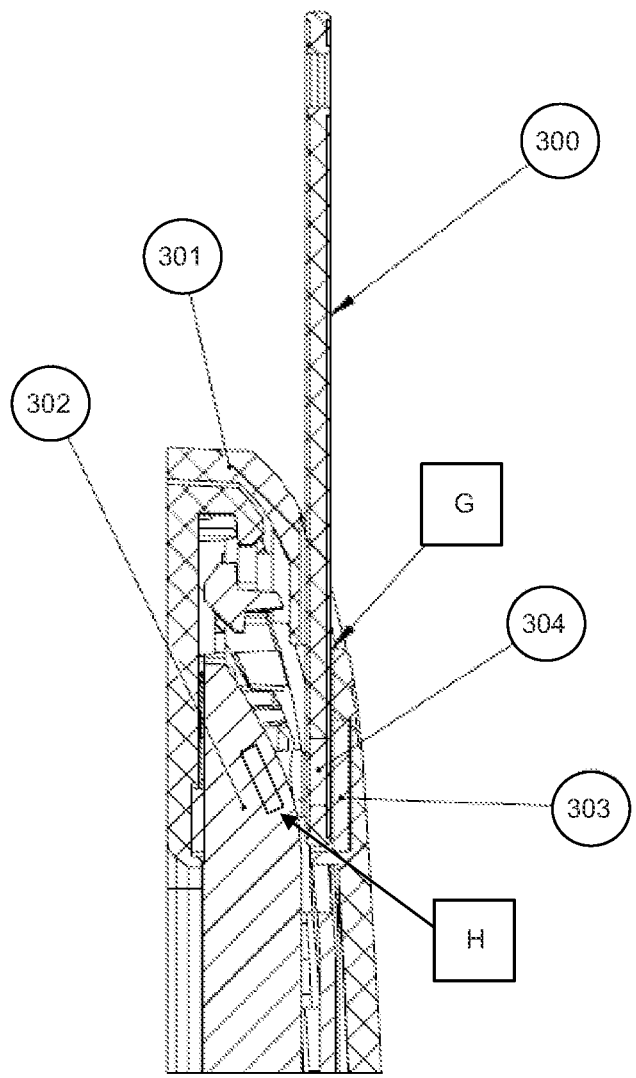
FIG. 3 illustrates a cross sectional view of an example system for affecting a sleep mode of an electronic device.

FIG. 3 illustrates an example device 300 in a housing 301 for an electronic device 302, in cross-sectional view. The example device 300 and housing 301 can be used in the electronic device system 100 of FIG. 1. The device 300 includes a magnet 304. The device 300 is adapted to be inserted into an aperture G, for example, a slot, in the housing 301. The aperture G positions the device 300, and consequently the magnet 304 within the device 300, behind a sleep sensor H in the electronic device 302. In some instances, the device 300 includes an elongate member, and the magnet 304 is disposed within the elongate member. The device 300, for example, the elongate member and the magnet 304, is shaped and sized to be received in the aperture G on the housing 301 of the electronic device 302 to activate the magnetic sleep sensor H on the electronic device 302. In some implementations, the housing 301 includes a magnetic plate 303, for example, a ferrous metal plate, configured to magnetically retain the device 300 in the aperture G.

Activation of the sleep sensor puts the electronic device 302 to sleep. In some implementations, and when the device 300 is inserted in the aperture G, the magnet 304 is magnetically attracted to the magnetic plate 303 positioned in the housing 301, thereby retaining the device 300 in the aperture G until the device 300 is intentionally removed from the aperture G. The elongate member and the magnet 304 collectively form a sleep mode key for the electronic device 302. The device 300 can be sized to fit into a pocket of a garment (for example, a pant, a shirt, and the like) such that the elongate member and the magnet 304 collectively form a pocketable fob. In some implementations, the device 300 can be sized to be as small as or smaller than a phone or a credit card or a wallet (for example, 80 mm×120 mm×25 mm). In some implementations, the device 300 can be sized to fit on a key ring (for example, 30 mm×100 mm×4 mm). The dimensions provided here are exemplary; other dimensions are possible. The device 300 can have dimensions different from those described here.

Figure 4:
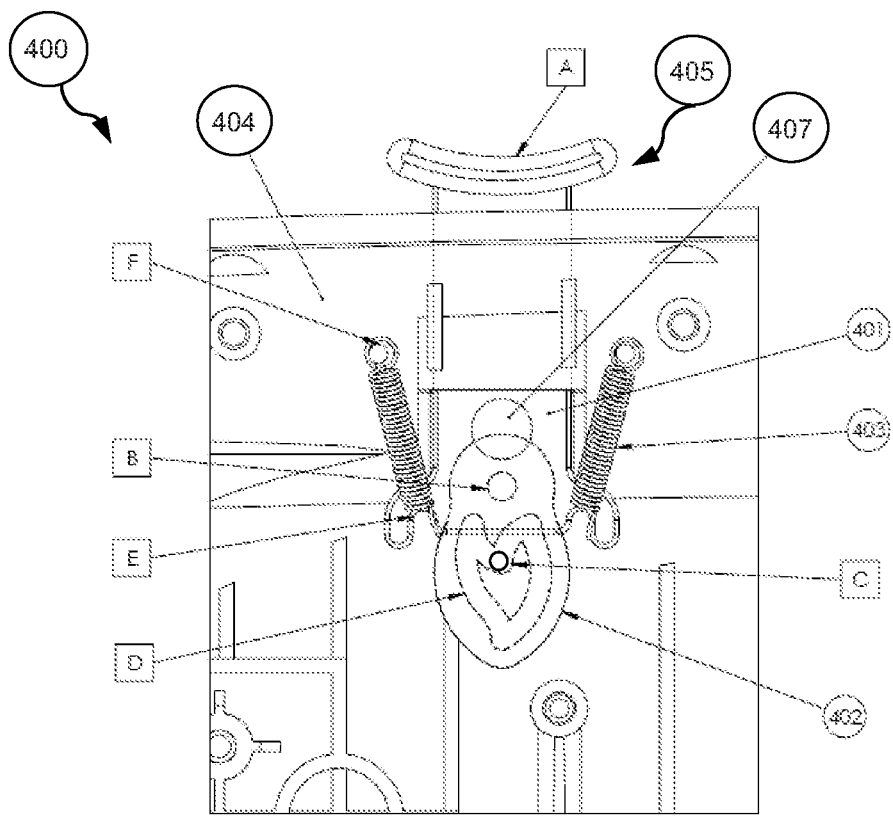
FIG. 4 illustrates an example system for affecting a sleep mode of an electronic device.

FIG. 4. shows an example system 400 for affecting a sleep mode of an electronic device. The system 400 includes a device 405 and a housing 404 to receive the electronic device. The housing 404 has an aperture to receive the device 405, and the device 405 includes a magnet 407. The device 405 is configured to activate a magnetic sleep sensor on the electronic device. The device 405 includes a mechanical arm 401, a toggle 402 connected to the mechanical arm, and a push button A connected to the mechanical arm 401 at an end exterior to the housing 404. The mechanical arm 401 is disposed with the housing 404, and the magnet 407 is disposed within the mechanical arm 401. The mechanical arm 401 is configured to be actuated to position the device 405 to activate the magnetic sleep sensor. The mechanical arm 401 is configured to toggle the toggle 402 between a first position in which the device 405 activates the magnetic sleep sensor and a second position in which the device 405 does not activate the magnetic sleep sensor. For example, the first position results in the magnet 407 being directly adjacent to the magnetic sleep sensor on the electronic device, whereas the second position results in the magnet 407 being at least a quarter of an inch away from the magnetic sleep sensor. The push button A is configured to be pushed to actuate the mechanical arm 401 to toggle the toggle 402, for example, between the first position and the second position. Depressing push button A causes the magnet 407 to be lowered into position where it activates the sleep sensor. The example shown in FIG. 4 operates as a "push-push". A user pushes the push button A to lower the magnet 407 into a position adjacent to the sleep sensor, and pushes again to release the mechanical arm 401, subsequently lifting the magnet 407 away from the sleep sensor. Toggle 402 governs the motion of the mechanical arm 401, and consequently the position of magnet 407. In some implementations, the housing 404 includes a pin C connected to the housing 404 and extending into a track D of the toggle 402, where the toggle 402 is configured to move around the pin C to follow the track D in response to a push of the push button A to actuate the mechanical arm 401. The toggle can include a pivot joint B with an axis about which the toggle 402 pivots. The pin C, embedded in the housing and extending into track D, rides in track D such that movement of the mechanical arm 401 causes the toggle 402 to move around pin C following track D. In some implementations, the housing includes a plurality of springs 403 connected on one end to the mechanical arm 401 and on another end to the housing 404. Springs 403 pull upward on the mechanical arm 401, which acts to toggle the toggle 402 into a position, for example, one of its two static positions, either as shown in FIG. 4 (the "down" position), or in a position where mechanical arm 401 and toggle 402 are raised up, with pin C disposed at the far bottom of track D (the "up" position). In the "down" position, the magnet 407 arrives in proximity to the sleep sensor. This action is reversible. In some implementations, the springs 403 attach to the housing 404 via spring tabs F, and the springs 403 attach to the mechanical arm 401 via spring hooks E. The device 405 of FIG. 4 is within, and stays within, the housing 404, except for the push button A and a portion of the mechanical arm 401. The system 400 is configured to put the electronic device within the housing 404 to sleep, but does so without the device 405 being removable.

A number of implementations have been described. Nevertheless, it will be understood that various modifications can be made without departing from the spirit and scope of the various inventions described herein.

What is claimed is:

1. A system for affecting a sleep mode of an electronic device, the system comprising:
   a housing in which the electronic equipment is receivable and from which the electronic equipment is removable, wherein the electronic equipment comprises a magnetic sleep sensor within the electronic equipment, wherein the housing comprises an aperture; and
   a magnetic key comprising:
      an elongate plate member; and
      a magnet disposed within the elongate plate member, the elongate plate member and the magnet shaped and sized to be received in the aperture in the housing, wherein the aperture is positioned in the housing at a location such that, when at least a portion of the magnetic key is received in the housing, the magnet is received in the aperture and is held by the aperture external to the electronic equipment and in proximity of the magnetic sleep sensor within the electronic equipment to activate the magnetic sleep sensor.

2. The system of claim 1, wherein the elongate plate member and the magnet collectively form a sleep mode key.

3. The system of claim 1, wherein the elongate plate member and the magnet collectively form a pocketable fob.

4. The system of claim 1, wherein the housing is external to and separate from the electronic device, wherein the housing is configured to securely enclose the electronic equipment, wherein the aperture is a slot formed in the housing of the electronic device, wherein the magnet disposed in the elongate plate member is configured to be received in the slot.

5. The system of claim 4, further comprising a connector to connect the magnet disposed within the elongate plate member to the housing, wherein the connector is configured to securely attach the device to the housing to activate the sleep sensor on the electronic device.

6. The system of claim 1, wherein the magnet disposed within the elongate plate member is configured to be magnetically held in the housing by magnetic forces induced by a magnetic metal plate included in the housing.

7. The system of claim 1, further comprising a left cover portion and a right cover portion, and wherein the elongate plate member is disposed between the left cover portion and the right cover portion.

8. The system of claim 7, wherein either the left cover portion or the right cover portion includes a label.

9. The system of claim 8, wherein the label indicates a polarity of the magnet relative to the cover portion on which the label resides.

10. The system of claim 1, wherein the elongate plate member comprises a longitudinal axis and defines an opening at a first end of the elongate plate member formed at an angle relative to the longitudinal axis, and wherein the magnet is positioned in the opening.

11. The system of claim 10, wherein a size of the elongate plate member at a second end is greater than a size of the elongate plate member at the first end.

12. The system of claim 11, wherein the elongate plate member includes an opening formed at the second end.

13. The system of claim 1, wherein the elongate plate member comprises at least one of thermoplastic, epoxy or elastomeric material.

14. The system of claim 1, wherein the elongate plate member comprises at least one of flexible, elastic, heat-resistant material.

15. The system of claim 14, wherein the elongate plate member comprises nylon.

16. The system of claim 1, wherein the electronic equipment comprises a tablet computer.

17. A system for affecting a sleep mode of an electronic device, the system comprising:
   a housing to receive the electronic device, the housing comprising an aperture; and
   a device for activating a sleep mode of the electronic device, the device comprising a magnet, the device configured to activate a magnetic sleep sensor on the electronic device, wherein the device further comprises:
      a mechanical arm configured to be actuated to position the device to activate the magnetic sleep sensor, the magnet disposed within the mechanical arm;
      a toggle connected to the mechanical arm, the mechanical arm configured to toggle the toggle between a first position in which the device activates the magnetic sleep sensor and a second position in which the device does not activate the magnetic sleep sensor; and
      a push button connected to the mechanical arm, the push button configured to be pushed to actuate the mechanical arm and toggle the toggle between the first position and the second position.

18. The system of claim 17, wherein the aperture comprises a slot, and wherein the housing further comprises a magnetic plate configured to magnetically retain the device in the slot.

19. The system of claim 17, wherein the device further comprises an elongate plate member, the magnet disposed within the elongate plate member, the elongate plate member and the magnet shaped and sized to be received in the aperture.

20. The system of claim 17, wherein the housing further comprises:
   a pin connected to the housing and extending into a track of the toggle, wherein the toggle is configured to move around the pin to follow the track in response to a push of the push button to actuate the mechanical arm; and
   a plurality of springs connected on one end to the mechanical arm and on another end to the housing, the plurality of springs configured to pull the mechanical arm to toggle the toggle into either the first position or the second position.

21. A device for affecting a sleep mode of an electronic device, the device comprising:
- a key comprising a front portion and a rear portion that is wider than the front portion, the front portion comprising a first aperture, the rear portion comprising a second aperture; and
- a magnet positioned in the first aperture, the key and the magnet shaped and sized to be received in an aperture in a housing in which an electronic equipment is receivable and from which the electronic equipment is removable, wherein the electronic equipment comprises a magnetic sleep sensor, wherein, when the key and the magnet are received in the aperture, the magnet is placed in proximity of the magnetic sleep sensor to activate the magnetic sleep sensor.

\* \* \* \* \*